(12) United States Patent
Hinterberger et al.

(10) Patent No.: US 7,689,207 B2
(45) Date of Patent: Mar. 30, 2010

(54) TIME OF DAY SYNCHRONIZATION AND DISTRIBUTION WITHIN A MULTIPROCESSOR EMBEDDED SYSTEM AND RELATED METHODS

(75) Inventors: David Hinterberger, Fairport, NY (US);
Lloyd Palum, Rochester, NY (US);
Nicholas Stocks, Henrietta, NY (US);
David March, Rochester, NY (US);
Terence W. O'Brien, Webster, NY (US);
Thomas Philbin, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 358 days.

(21) Appl. No.: 11/252,123

(22) Filed: Oct. 17, 2005

(65) Prior Publication Data
US 2007/0087734 A1    Apr. 19, 2007

(51) Int. Cl.
*H04M 3/00* (2006.01)
*G06F 1/12* (2006.01)
*G06F 1/00* (2006.01)

(52) U.S. Cl. .................. 455/418; 713/400; 713/500

(58) Field of Classification Search .............. 455/550.1, 455/502, 418, 419; 713/400, 500; 717/100; 342/385, 386, 394, 395; 375/354–376; 370/324, 370/350, 395.62, 503–507, 509–514, 520
See application file for complete search history.

(56) References Cited

U.S. PATENT DOCUMENTS

| 3,932,847 A * | 1/1976 | Smith .................... 713/400 |
| 4,349,890 A | 9/1982 | Chang .................... 364/900 |
| 5,040,158 A | 8/1991 | Lee et al. ................. 368/10 |
| 5,327,468 A | 7/1994 | Edblad et al. ............ 375/107 |
| 6,138,243 A * | 10/2000 | Mealey et al. ............ 713/400 |
| 6,466,607 B1 | 10/2002 | Chauncey et al. ......... 375/131 |
| 6,804,169 B2 | 10/2004 | Addy et al. ............... 368/10 |
| 7,095,349 B1 * | 8/2006 | Mauer ..................... 341/147 |
| 7,367,020 B2 * | 4/2008 | Bickle et al. ............. 717/143 |
| 7,369,631 B1 * | 5/2008 | Gifford et al. ............ 375/346 |
| 7,376,939 B1 * | 5/2008 | Nayak et al. ............. 717/144 |
| 7,430,257 B1 * | 9/2008 | Shattil ..................... 375/347 |
| 2003/0114163 A1 | 6/2003 | Bickle et al. ............. 455/450 |
| 2003/0231714 A1 * | 12/2003 | Kjeldsen et al. .......... 375/259 |
| 2004/0022332 A1 * | 2/2004 | Gupta et al. .............. 375/343 |
| 2004/0037282 A1 | 2/2004 | Boland et al. ............. 370/392 |
| 2004/0117667 A1 * | 6/2004 | Lavender et al. ......... 713/202 |
| 2004/0133554 A1 | 7/2004 | Linn et al. ................ 707/2 |
| 2004/0242261 A1 | 12/2004 | Fette ...................... 455/550.1 |
| 2005/0007988 A1 | 1/2005 | Ferris et al. .............. 370/349 |
| 2005/0108382 A1 * | 5/2005 | Murotake et al. ......... 709/223 |
| 2006/0015674 A1 * | 1/2006 | Murotake ................. 711/101 |
| 2006/0109940 A1 * | 5/2006 | Beukema et al. ......... 375/350 |
| 2006/0168587 A1 * | 7/2006 | Aslam-Mir ............... 718/105 |
| 2006/0291589 A1 * | 12/2006 | Eliezer et al. ............ 375/302 |

* cited by examiner

*Primary Examiner*—George Eng
*Assistant Examiner*—Christopher M Brandt
(74) *Attorney, Agent, or Firm*—Allen, Dyer, Doppelt, Milbrath & Gilchrist, P.A.

(57) ABSTRACT

A software-defined radio includes a pair of radio subsystems such as a red (command) and black (data) radio subsystem having an operating environment conforming to the Software Communications Architecture (SCA) specification, for example, as used for Joint Tactical Radio System (JTRS). A clock is read by at least one of the radio subsystems for determining time of day. A processor of the radio subsystem is operative for distributing the time of day to the radio subsystems using a global hardware timing pulse. Each processor can include a free-running timer to which any time sources within the pair of radio subsystems are set.

26 Claims, 11 Drawing Sheets

TIME OF DAY SYNCHRONIZATION AND DISTRIBUTION WITHIN A MULTIPROCESSOR EMBEDDED SYSTEM AND RELATED METHODS

FIELD OF THE INVENTION

The present invention relates to a software communications architecture (SCA) for radios and other applications having embedded processors.

BACKGROUND OF THE INVENTION

With advances in processing capabilities and programming technologies, software defined mobile wireless communications devices (e.g., radios) continue to increase in popularity. Rather than relying upon hardware and circuitry components to perform tasks such as frequency, modulation, bandwidth, security functions, and waveform requirements, these functions are performed by software modules or components in a software radio. That is, with a software radio analog signals are converted into the digital domain where the above-noted functions may be performed using digital signal processing.

Because most of the functions of the radio are controlled by software, software radios may typically be implemented with relatively standard processor and hardware components. This may not only reduce device hardware costs, but is also provides greater flexibility in upgrading the device since new communications waveform modules can be uploaded to the device relatively easily and without the need to interchange new hardware components.

One particular class of software radio, which takes advantage of the above-described advantages features is the Joint Tactical Radio (JTR). The JTR radio includes relatively standard radio and processing hardware along with the appropriate waveform software modules for the communication waveforms the radio will use. JTR's also utilize operating system software that conforms with the Software Communications Architecture (SCA) Specification (see www.JTRS.saalt.mil), which is hereby incorporated by reference in its entirety. The SCA is an open architecture framework that specifies how hardware and software components are to interoperate so that different manufacturers and developers can readily integrate their respective components into a single device.

Still another class of mobile wireless communications devices that increasingly use software components for communicating with different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them; some may be implemented by non-core applications (i.e., waveforms, etc.), and some may be implemented by hardware device providers.

The specifications for the JTRS radio and SCA typically require an interface for command and data (red and black) processing systems. A radio platform may include multiprocessor embedded systems, including Field Programmable Gate Arrays (FPGA's). In some current systems, the timing synchronization between processing elements is often orchestrated in the software. This scheme uses a series of message exchanges between the processing elements, where one of the elements provides the definitive time reference in the messaging that is sent. This current technique has limits on the accuracy that can be achieved because of the interrupt latency and timing variability in the message exchange. It would be desirable to determine a way to accurately synchronize the time of day between multiple processors and processes within these embedded systems operative typically as a software radio, such that the synchronization can be accurately determined with less than one microsecond of inaccuracy.

SUMMARY OF THE INVENTION

In view of the foregoing background, it is therefore an object of the present invention to provide a time of day synchronization and distribution within a software defined radio having multiple radio subsystems without using a series of time inaccurate message exchanges.

In accordance with a non-limiting example of the present invention, a software-defined radio includes a pair of radio subsystems each having a processor. A real time clock is operative to be read by at least one of the radio subsystems for determining time of day. The processor is operative for distributing the time of day to radio subsystems using a global hardware timing pulse. The pair of radio subsystems can be formed as a red (command) and black (data) radio subsystem that are conformable to the Software Communications Architecture (SCA) specification.

In one aspect, each processor can be formed as a Field Programmable Gate Array (FPGA), each including a free running timer to which any time sources within the pair of radio subsystems are set. Each processor can include registers in which the time of day is stored, which are incremented in unison to each other using a common clock to create a free-running system time. At least one processor can be operative for computing time of day offsets to the free-running system time when the time of day has changed and distributing the time of day offsets to the free-running system time for the radio subsystems.

In another aspect, a waveform source can be instantiated to the radio subsystems, wherein the time of day can be obtained from a waveform. Time of day offsets can be distributed using a Common Object Request Broker Architecture (CORBA).

A method aspect is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

In one non-limiting embodiment of the present invention, free-running timers are synchronized in counters, for example, in Field Programmable Gate Arrays (FPGA's) and time sources are latched relative to free-running counters. The system captures these offsets and distributes offsets around the system. Time is as accurate as it can be clocked into the FPGA's. This allows a system to use CORBA as a standard SCA communication mechanism to pass time of day offsets around the system. A time of day service code can be responsible for providing these offsets to the rest of the system. Thus, it is possible to keep accurate time to all system components, such as the red processors, e.g., FPGA's or Digital Signal Processor (DSP's), as well as the waveform and operating environment software.

When a radio powers-up, the current time of day is read from a real-time clock (RTC) chip and stored in a pair of FPGA registers on both sides of the radio, i.e., in the radio platform using the SCA architecture, the red and black subsystems. The time is substantially instantiated, e.g., created or loaded in all processing elements using a global hardware timing pulse. Once the registers are loaded, they can begin to increment in lock step using a common clock source. These registers will continue to increment while the radio is powered creating a free running "system time." When the radio time is changed, an offset to the radio time relative to the free-running system time will be computed and stored in memory. Radio time of day is distributed as an offset to the free-running system time. By having a set of processing elements synchronized from the same clock pulse, the system can ensure that system times will always be synchronized to within a high degree of accuracy. This can be critical for frequency hopping applications.

By passing radio time changes as an offset to the system time, the system can ensure accurate time transfer. Time can also be updated from any processor and can still be synchronized without worrying about latency when passing messages. Time-dependent waveforms, e.g., SINCGARS or HaveQuickII time, typically need to be synchronized as closely as possible, otherwise communication between radios can be compromised. Thus, a JTRS SCA based radio can now have an SCA based architecture with a predefined mechanism for synchronizing the operating environment and the waveform application components to the degree of accuracy that is required by many frequency hopping waveforms.

Figure 1:
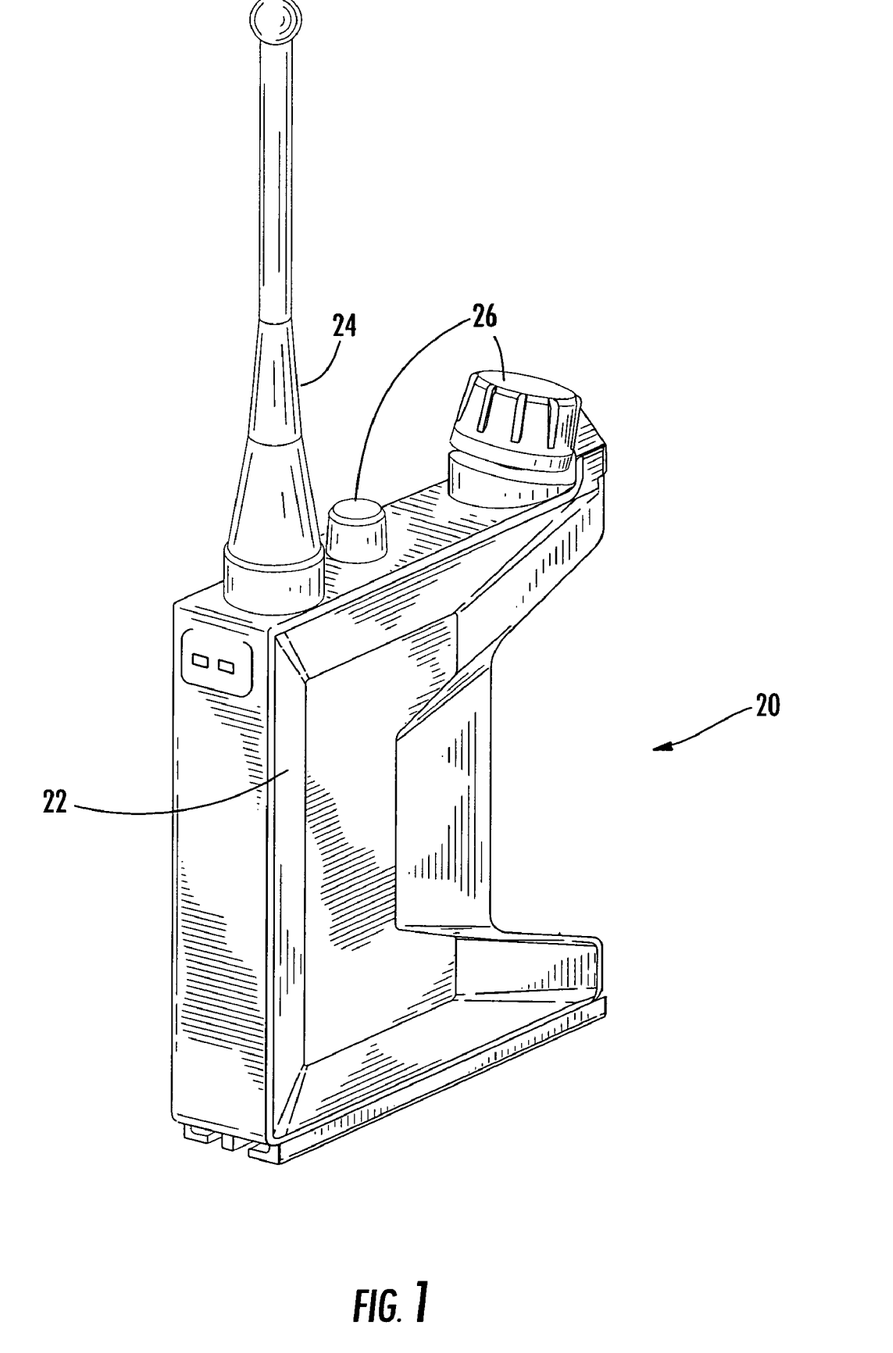
FIG. 1 is perspective view of a portable wireless communications device as a handheld radio that could incorporate the time of day synchronization and distribution in accordance with a non-limiting example of the present invention.

The time of day synchronization and distribution within a multiprocessor embedded system and related methods can be used for any type of radio software communications architecture as used on mainframe computers or small computers, including laptops with an added transceiver, such as used by military and civilian applications, or in a portable wireless communications device 20 as illustrated in FIG. 1. The portable wireless communications device is illustrated as a radio that can include a transceiver as an internal component and handheld housing 22 with an antenna 24 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used when any processor system operative with the transceiver using SCA and the time of day synchronization and distribution in accordance with the present invention.

Figure 1A:
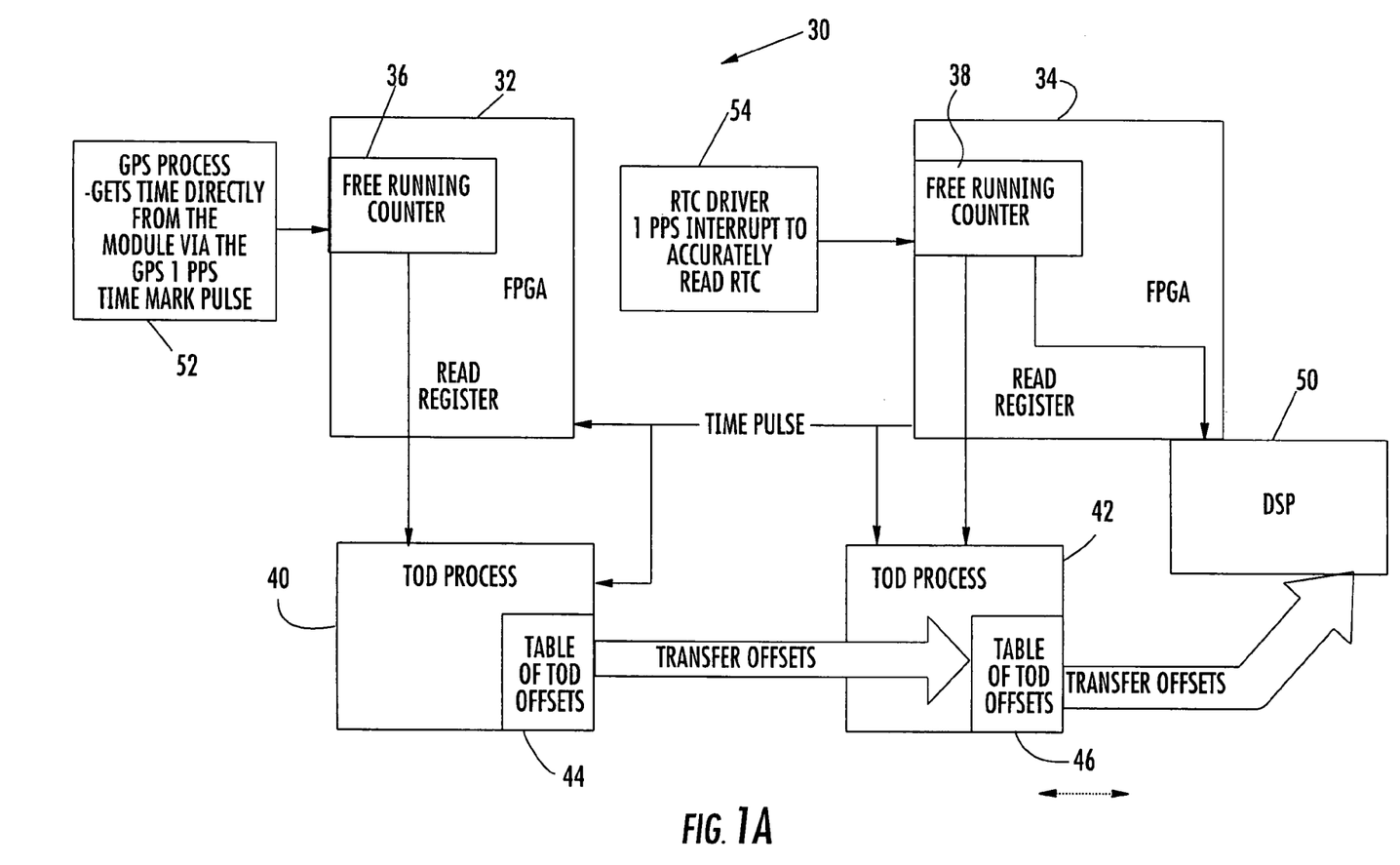
FIG. 1A is a block diagram illustrating two processors formed as field programmable gate arrays (FPGA's) and incorporating the time of day synchronization and distribution in accordance with a non-limiting example of the present invention.

FIG. 1A is a high-level block diagram showing a time of day synchronization and distribution system 30 and basic functional components, including two field programmable gate arrays (FPGA's) 32,34 that correspond to the red and black, or command and data FPGA's in non-limiting systems. Each FPGA 32,34 includes a free-running counter 36,38 each operative with a time of day (TOD) process circuit function 40,42, with each process having a table of TOD offsets 44,46 such that one offset 44 is in communication by Transfer Offsets to the other offset 46. Each FPGA has a read register. One table of TOD offsets 46 sends Transfer Offsets to a digital signal processor (DSP) 50 operative with FPGA 34. The first FPGA 32 receives signals from a GPS process function 52 and gets time directly from a module via a GPS one pulse per second (Pps) time mark pulse. The other FPGA 34 is operative with a real-time clock (RTC) driver 54 and a one Pps interrupt to read accurately the real-time clock.

Figure 6:
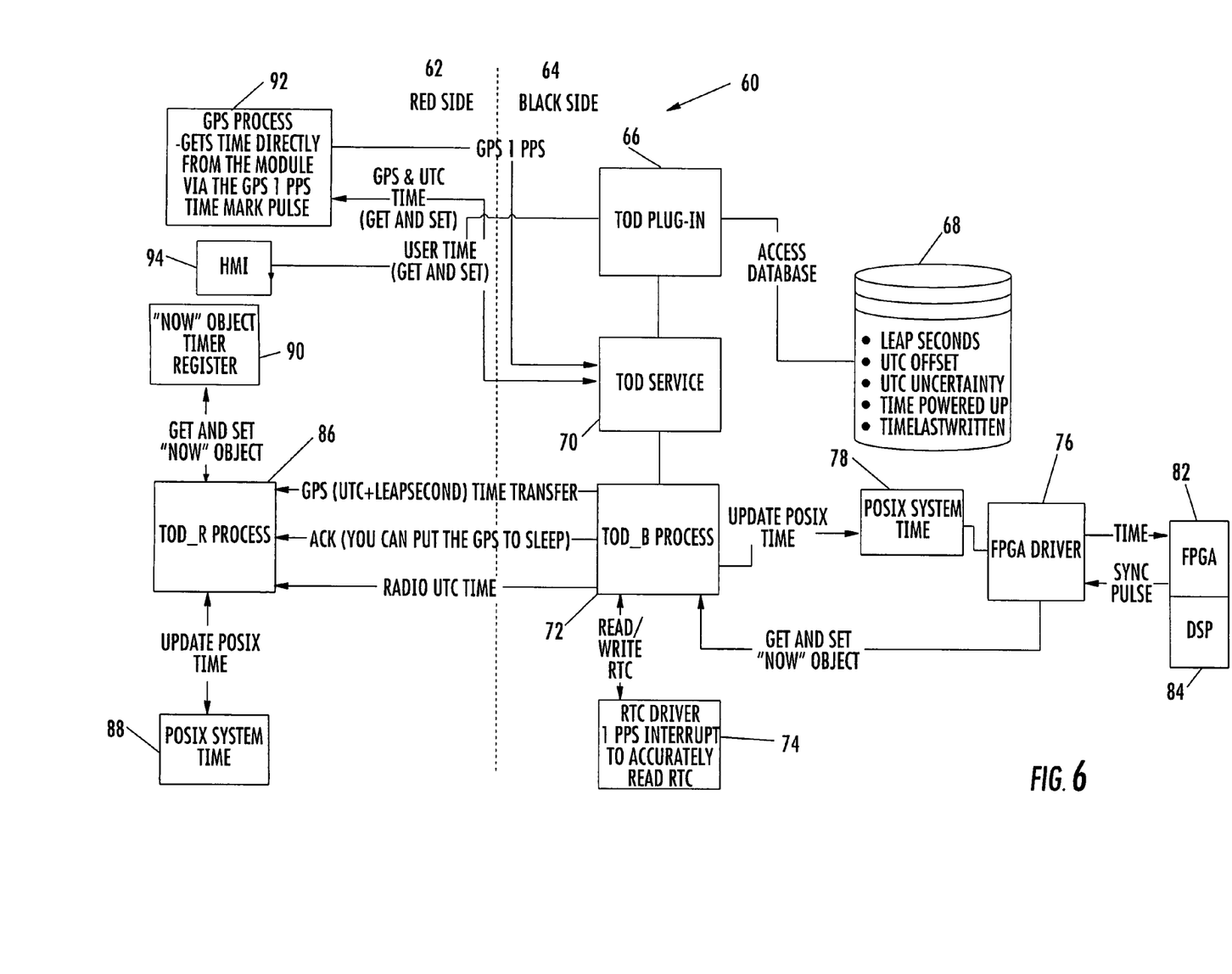
FIG. 6 is a high-level block diagram of basic software components used in the time of day synchronization and distribution in accordance with a non-limiting example of the present invention.

FIG. 6 is a block diagram of a software system 60 showing basic software components of time of day synchronization and distribution. The red side and black side 62,64 are illustrated with the black side including a time of day plugin 66 with an access for the database 68, including Leap Seconds, UTC offset, UTC uncertainty, Time Powered Up and Time Last Written. The TOD plugin 66 is operative with the TOD Service 70 and a TOD_B process 72 that is operative with a read/write real-time clock (RTC) and driver 74 and having one Pps interrupt to read accurately the RTC. The database 68 is operative with an FPGA driver 76 that is operative with a Portable Operating System Interface (POSIX) System Time 78 and a "Now" Object FPGA Timer Register that is operative with the TOD_B process 72 with a get and set "Now" object. The FPGA driver 76 is operative with an FPGA 82 and DSP 84 for time and synchronization pulses. The TOD_R process 86 is operative to receive GPS (UTC+Leap Second) Time transfers, an acknowledgment (ACK) that the GPS can "sleep" signal, and a radio UTC time from the TOD_B process 72. The POSIX System Time 88 on the black side is operative with the TOD_R process 86 to obtain an update POSIX time. The TOD_R process 86 is operative with a "Now" Object FPGA Timer Register 90 and operative for get and set "Now" objects. The GPS Process 92 on the red side can obtain time directly from a module via the GPS one Pps time marked pulse and transmits signals to the TOD service 70 on the black side and is operative with GPS and UTC time for get and set. An HMI 94 as a human machine interface is operative with the TOD plugin for user time with a get and set.

Generally, TOD is used to manage and provide accurate time throughout the radio. TOD is made up of a black-side component, which could be indicated as TOD_B Process 72, and the red-side component, which could be indicated as TOD_R Process 86, the TOD Service 70, and a TOD plugin 66. TOD_B Process and TOD_R Process are responsible for updating the black and red hardware components of the radio. The TOD service 70 provides time information and manages the synchronization of various hardware and software time components within the radio. This synchronization includes making calls to TOD_B Process 72 to update the clock. The TOD Service 70 will also provide any registered users notification of any pending time adjustments, via a notification server. The TOD plugin 66 connects to the platform database 68 and is used to write and receive TOD data.

In one non-limiting example, the time of day can be updated by two sources: the user, for example, via HMI 94 (ascii, front panel, testable interface), or by a GPS Process 92 with GPS having the higher priority. A source with a lower priority cannot update the time if the time has already been changed by a source with a higher priority. Because a waveform cannot see a time jump or go backward in time, time changes can only be made when a waveform is not instantiated.

When a time update is requested, the delta time change is computed and a message is sent through a notification server having a notification service that there is a pending update. This message will be used by all plugins that need to track time changes. The time offset can be tracked until there is no waveform instantiated. Once there is no waveform instantiated, the TOD service 70 can make a call to the TOD_B Process 72 to update the clock and synchronize the TOD_R Process 86 to TOD_B Process 86.

There will typically be one TOD Service 70 instance running on the radio. This instance will interface with the TOD_B process 72, as well as the TOD plugin 66 as part of the system. The TOD_B process 72 interacts with the Real-Time Clock (RTC) chip and driver 74 and any black FPGA hardware. It also updates the UTC Time ("Now" object) and the Operating System (OS) clock (on power up). Any time adjustments can be sent to the TOD_R process 86b and are synchronized using a hardware line between TOD_B and TOD_R. Updates to UTC Time ("Now" object) and the OS clock (only on power up) on the red side are then performed by TOD_R. The TOD system plugin 66 will be used to access the database.

Time adjustments may come from other sources besides the Global Positioning System (GPS). Time adjustments may not be immediate. A policy will typically exist that will determine which time sources can adjust the time. More accurate time sources could be allowed to adjust the time if the current time was set using a less accurate source. Less accurate time sources, however, will not be allowed to adjust the time if the current time was set using a more accurate time source.

The GPS process can send time updates before the GPS one (1) pulse-per-second (PPS) interrupt occurs. The time update can contain the time value at the next pulse. The time obtained from the TOD Service typically may be the most accurate time data in the radio due to CORBA latency. The accuracy of the time on this port is indeterminate. Multiple components in the radio may be interested in obtaining time information through TOD Service.

Time can be obtained through the RTC chip, the "Now" object, or the TOD Service. The TOD Service is used by waveforms to obtain time. Any other components that are interested in obtaining time can use the TOD Service. The components that use the time provided by the TOD Service should be aware that this time will not be the most accurate time in the radio due to CORBA latency.

Figure 2:
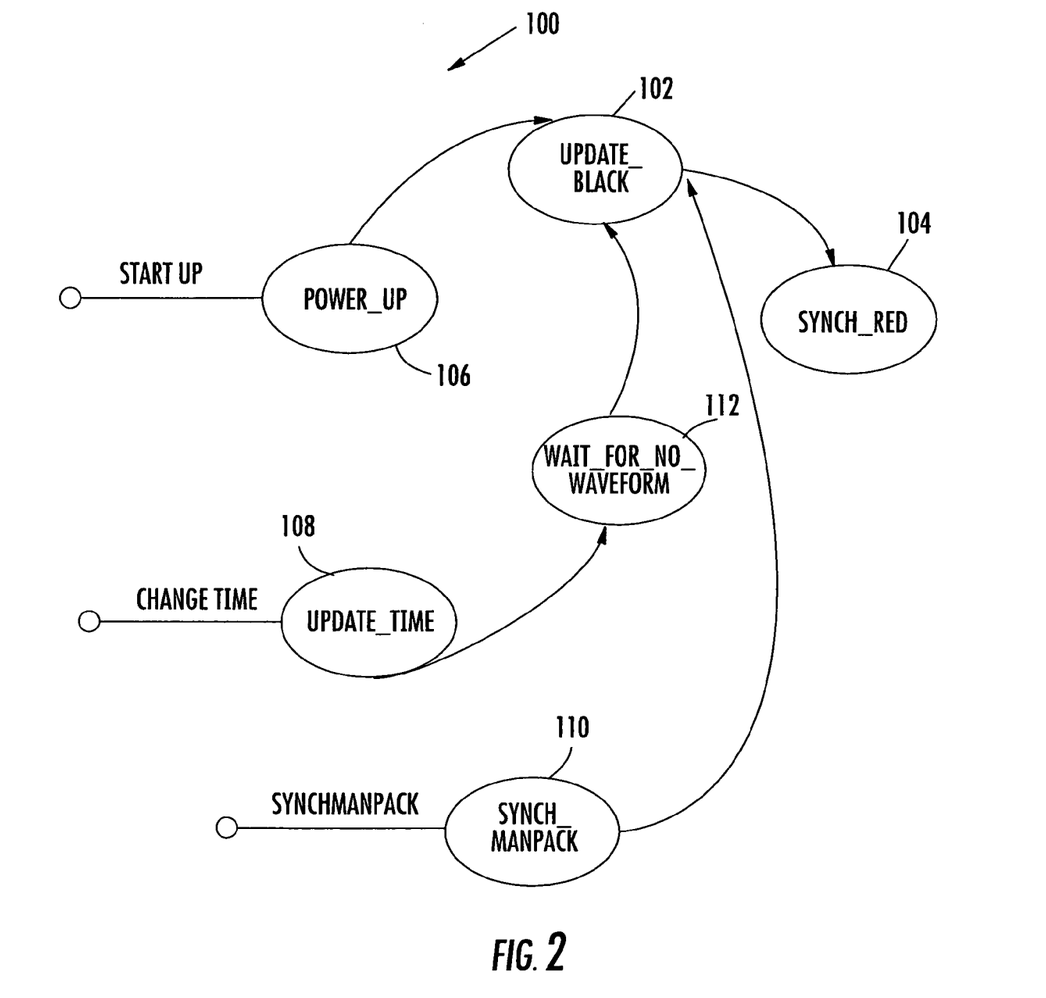
FIG. 2 is a state diagram for the time of day synchronization and distribution in accordance with a non-limiting example of the present invention.

A state diagram is shown in FIG. 2 at 100. UPDATE_BLACK 102 and SYNCH_RED 104 handle updating black and red time components (respectively). POWER_UP 106 is start up of all TOD components. UPDATE_TIME 108 handles time updates that come in from HMI or GPS. SYNCH_MANPACK 110 handles time synchronization between some channels. WAIT_FOR_NO_WAVEFORM 112 will monitor system until there is no waveform instantiated.

TOD_B and TOD_R Process 72,86 are stand-alone processes that are used to synchronize time between the red and black sides. The TOD Service 70 contains an instance of a TOD_B Application Programming Interface (API) to command the TOD_B process 72. The TOD_B process 72 acts as a slave to the TOD Service 70 in this regard. No communications channel exists for TOD_B to make calls on the TOD Service. The TOD_B Process is responsible for synchronizing the current time with TOD_R Process.

TOD_B responsibilities include:
1. Read RTC chip at power up;
2. Update black side time components which include:
   a. UTC time ("Now" object) which is maintained in a hardware timer on a Black FPGA (BFPGA);
   b. POSIX system time (power up only); and
   c. RTC chip; and
3. Synchronize time with TOD_R using a hardware synchronization line.

TOD_R responsibilities:
1. Update red side time components which include:
   a. UTC time ("Now" object) which is maintained in a HW Timer on a Red FPGA (RFPGA); and
   b. POSIX system time (power up only).

The TOD Service 70 can include different ports for interface and communication. A User TodOp port allows the HMI to make adjustments to the time of day. Since GPS has a higher priority than HMI, the HMI will only be allowed to change the time if GPS has not already updated time. Also, these adjustments are not always made immediately. Since a waveform cannot see a jump in time, the adjustment will be made when there is no instantiated waveform. Once there is no instantiated waveform, the adjustments are made to the underlying time components that exist in TOD_B and TOD_R. A GpsTodOp port allows GPS make adjustments to time of day. The same applies as before because adjustments are not always made immediately. Since a waveform cannot see a jump in time, the adjustment will be made when there is no instantiated waveform. Once there is no instantiated waveform, the adjustments are made to the underlying time components that exist in TOD_B and TOD_R.

A WaveformTodOp port will send the current time information to a waveform when requested.

A TimeAdNotification port is used to send out notifications that a component in the system wants to adjust the time. This notification will be used by all components that need to track the time to keep up to date of the current delta time.

An AccessDatabase port will allow TOD Service to retrieve and update a database configuration as needed. This connection is an internal connection between TOD Service and a TOD system plugin. The data that is included in database configuration includes: UTC time, UTC offset, power up time, time last updated and who last updated.

A NotifyTimeChange port is used to send out the new time offset to any waveform or plugin that is tracking time specific components for a waveform.

Figure 3:
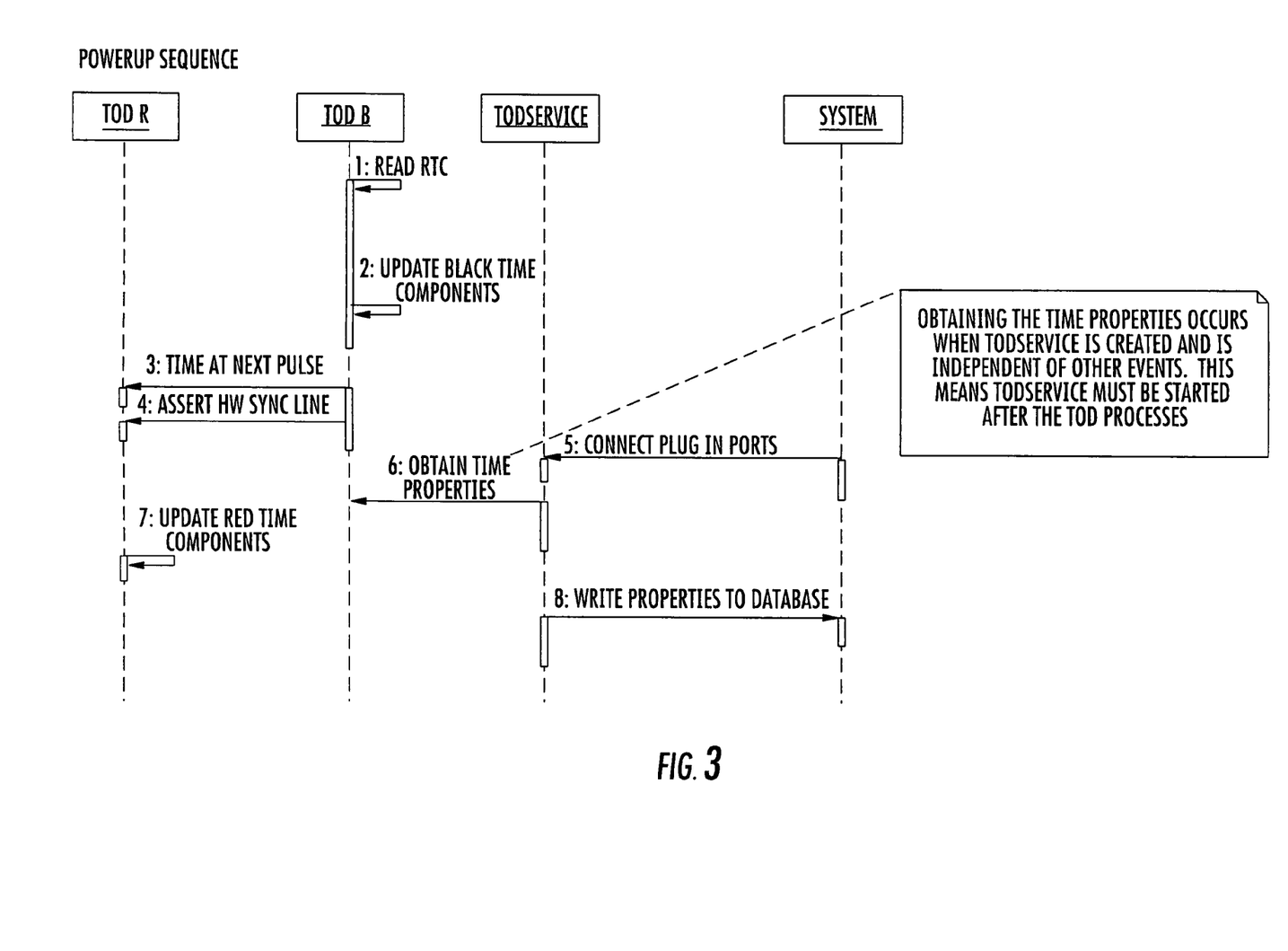
FIG. 3 is a sequence chart showing the power-up sequence for the time of day synchronization and distribution in accordance with a non-limiting example of the present invention.

FIG. 3 is a sequence and time chart for a power-up sequence and showing at top the TOD-R Process, TOD-B Process, TOD Service and system. The TOD_B and TOD_R processes are started by a system initiation. The TOD Service is started by a Black Input/Output Processor (BIOP) platform. The sequence of numbers shows the time flow. The Real-Time Clock (RTC) chip 74 is read by TOD_B and is used to initialize time components:
a. TOD_B 72 updates the "Now" object 80 on the black side;
b. TOD_B 72 updates the POSIX system time 78 on the black side; and
c. TOD_B 72 synchronizes with TOD_R 86. The synchronization process involves TOD_B 72 sending the current time to TOD_R. TOD_R 86 uses this time to update the "Now" object 90 and POSIX system time 88 on the red side.

The System Process connects to plugin ports from TOD Service 70 to TOD Plugin 66 ports on the system process. The TOD Service 70 queries TOD_B 72 for power-up values (Time Last Written, Time Source, etc.). These values are then written to the database 68 through the system plugin 66 port. Database queries will not be allowed until TOD_B 72 is initialized.

Figure 4:
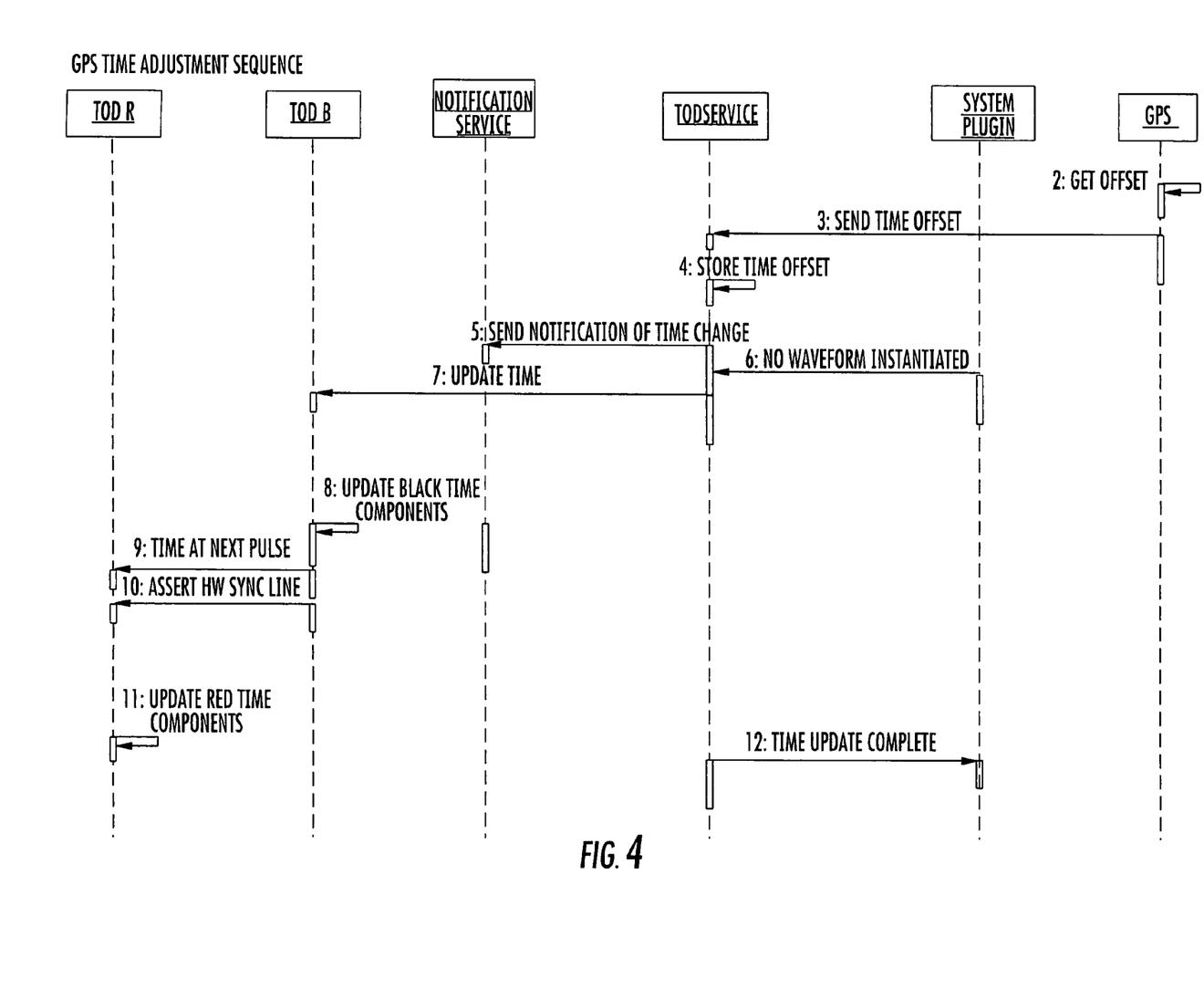
FIG. 4 is a chart showing the GPS time adjustment sequence for the time of day synchronization and distribution in accordance with a non-limiting example of the present invention.

FIG. 4 is a sequence and time chart for a GPS Time Adjustment Sequence and also showing the Notification Service, System Plugin and GPS. The sequence of numbers shows the time flow. GPS gets a GPS pulse and calculates an offset between the current radio time and the GPS time. GPS will send this offset to the TOD Service 70, which sends a notification of a pending update. The TOD Service waits for no waveform to be instantiated (i.e., it will listen for notification from system). Once there is no waveform, TOD Service makes call to TOD_B to update time. TOD_B makes the time adjustment. The adjustment involves updating the "Now" object on the black side. TOD_B synchronizes with TOD_R. TOD_R updates the "Now" object on the red side. Notification is sent of a change in time request.

Figure 5:
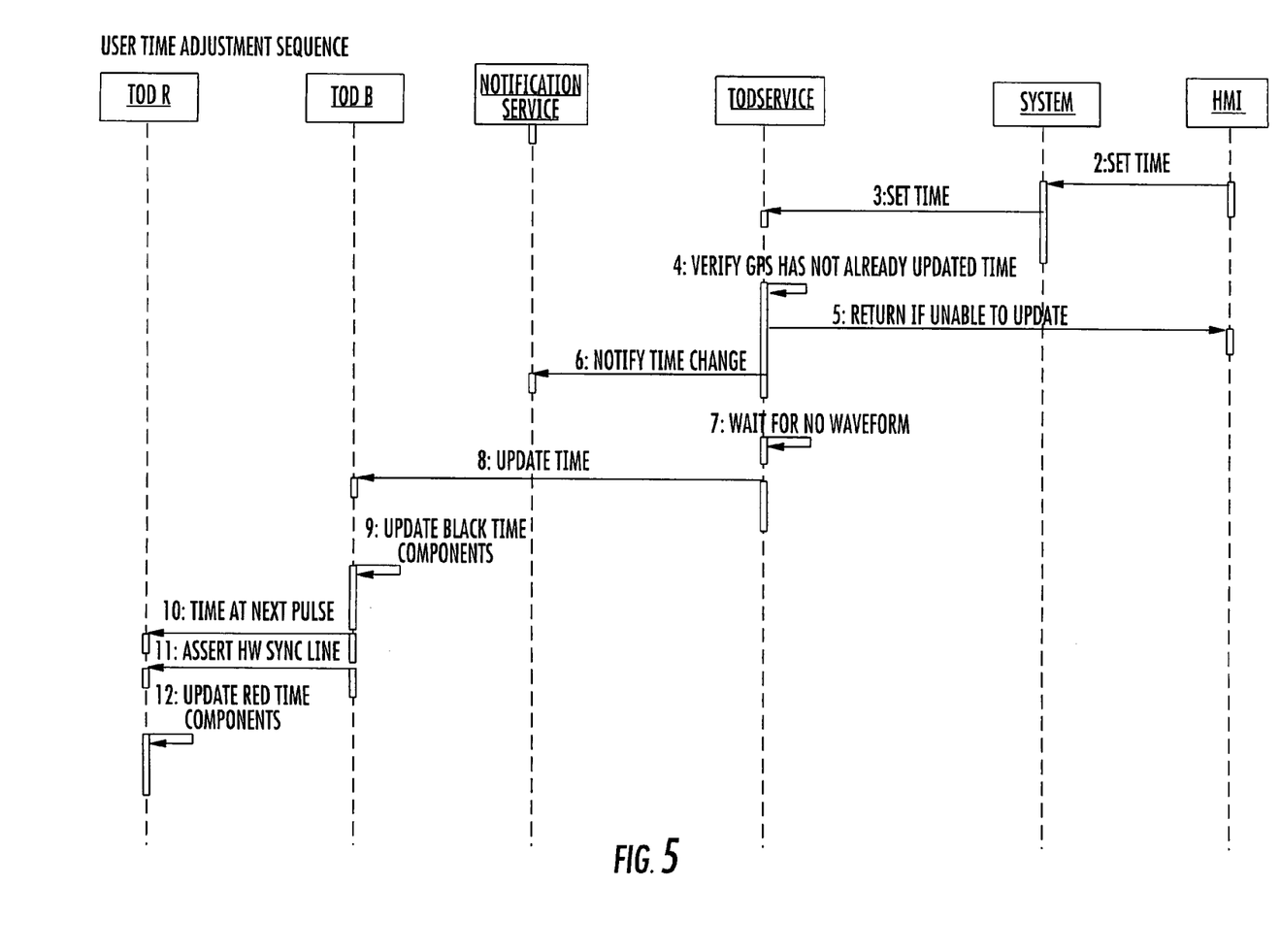
FIG. 5 is a chart showing the user's time adjustment sequence for the time of day synchronization and distribution in accordance with a non-limiting example of the present invention.

FIG. 5 is a User Time Adjustment Process and showing HMI instead of GPS. The sequence of numbers shows the time flow. The user process (e.g., ASCII) sends a message to the system with new time value. The system makes a call to TOD Service with a new time value. The TOD Service verifies that GPS has not updated the time. If GPS has updated time, an error will be returned. The TOD Service sends a notification that there is a pending update. The TOD Service waits for no waveform to be instantiated (i.e., it will listen for notification from system). Once no waveform is instantiated, the TOD Service makes a call to TOD_B to update the time. The TOD_B synchronizes with TOD_R. The TOD_R updates the "Now" object on the red side. Notification is sent of a change in time request.

Since not all plugins are loaded at startup, there needs to be a way to track a time offset for the waveforms until their plugin is started. This can be accomplished in various ways and, in one non-limiting example, as described.

When a fill command is called, a time from a security service will be sent to the TOD Service. This will be done by creating a port (CORBA) connection between a security service and TOD Service. An offset will be computed between the fill time and the radio time. This offset will be updated during time changes. When a waveform plugin is started, it will make a call through the WaveformTodOpPort (CORBA) to obtain the offset. The plugin can use this offset as a basis for any time offsets that it may need. During the case that a waveform is started and its plugin is already running, the plugin can obtain the offset from the TOD Service to ensure the correct offset is being used. The system will not update the "Now" object when the system is in a FILL mode or in WAVEFORM mode. The system will wait until there are no waveforms instantiated. The waveform will get the Offset using the "WaveformTodOp" port. The system will add a function to retrieve this parameter.

In the system as described, the HMI can send a command to fill, and the security service can send a time message to the TOD Service, which computes offset between "fill time" and radio time, and then the TOD Service stores the offset.

For the Waveform Plugin, the system starts the plugin. On waveform instantiation, a domain manager will make a port connection between the waveform and TOD Service. The waveform will make a call through the WaveformTodOp port and get the offset from TOD Service. The plugin updates its time components based on offset.

The security service can send a time offset to the TOD Service, which can store and track offsets. When a waveform is instantiated, the waveform or the waveform plugin can retrieve the time offset from the TOD service.

Referring again to FIG. 6. The TOD Service 70 is responsible for taking the time of day requests from GPS, HMI, and a waveform. The TOD Service will go through the TOD plugin 66 to access the database 68. The TOD Service 70 will go through the TOD_B process 72 to update time components on the black side of the radio. The TOD_B process 72 will update the black-side POSIX 78, the "Now" object 80 and the Real-Time Clock 74. The TOD_B process 72 will also send updated time to the TOD_R process 86, which will update the red-side POSIX 88 and "Now" object 90.

Figure 7:
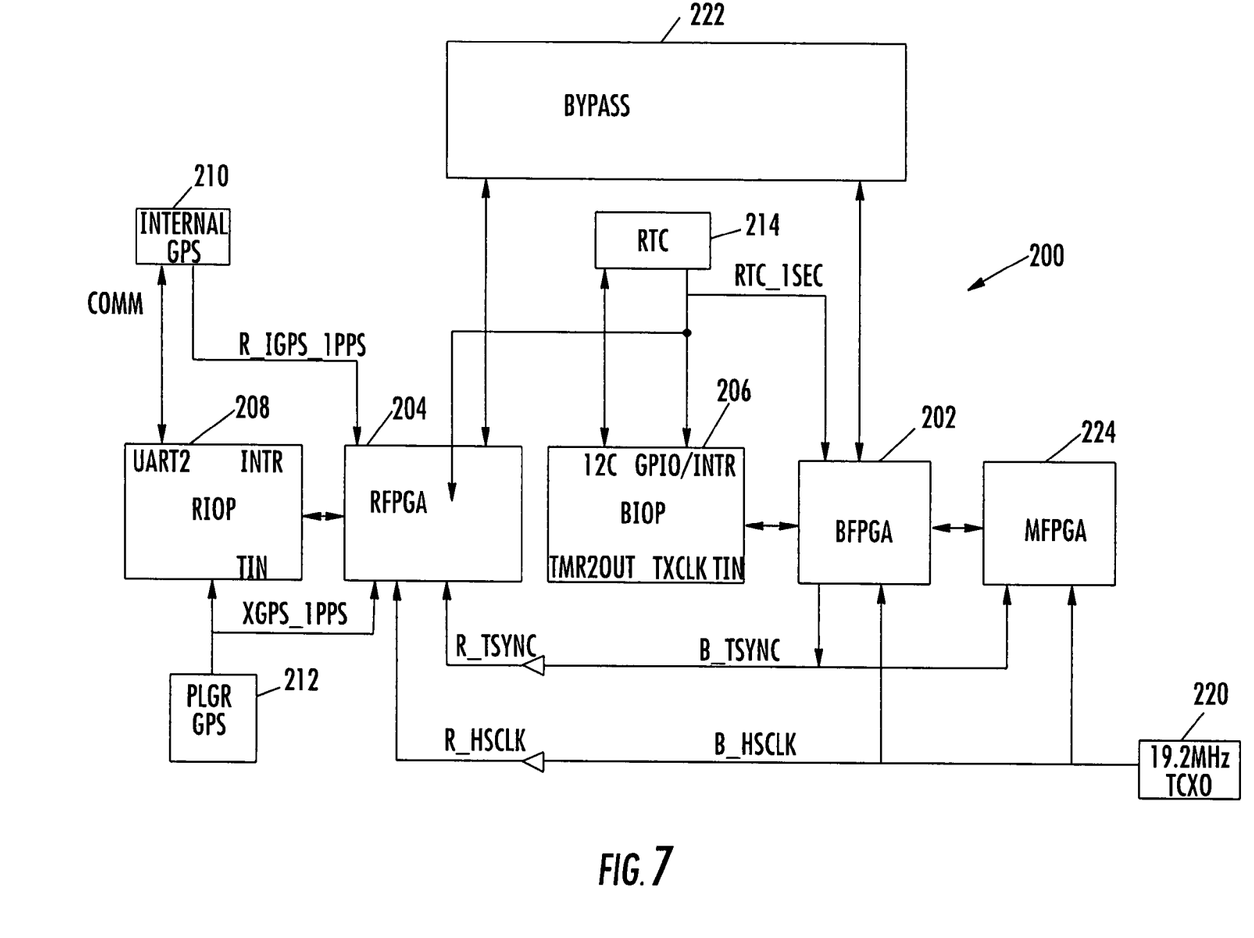
FIG. 7 is a block diagram showing basic hardware components used in the time of day synchronization and distribution in accordance with a non-limiting example of the present invention.

FIG. 7 is a system 200 showing an example of a block diagram of the functional hardware components that can be used in the time of day synchronization and distribution in one non-limiting example of the present invention. There are illustrated the black and red FPGA circuits 202, 204, each operative with the respective black and red input/output processors 206, 208. The red input/output processor 208 is operative with an internal GPS circuit 210 and a precision lightweight GPS receiver (PLGR) 212. The black input/output processor 206 is operative with the real-time clock 214. The red and black FPGA's 202, 204 receive a 19.2 MHz timer signal from a temperature controlled crystal oscillator (TCXO) 220. Both red and black FPGA's 202, 204 are operative with a SIERRA/BYPASS circuit 222 and the black FPGA is operative with another FPGA circuit (MFPGA) 224. The various signals between components are illustrated.

Figure 8:
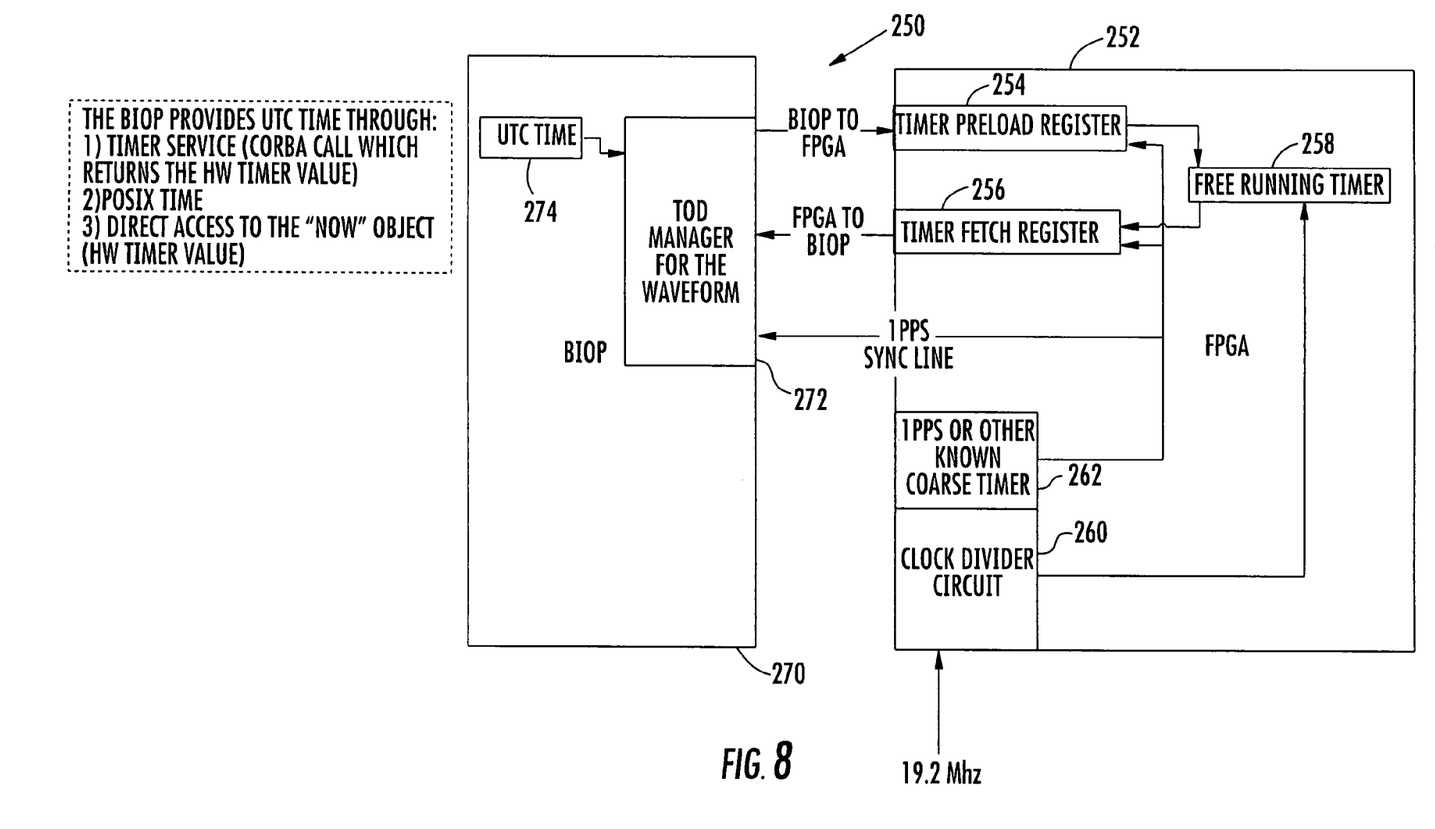
FIG. 8 is a block diagram showing the field programmable gate array time architecture used in the time of day synchronization and distribution in accordance with a non-limiting example of the present invention.

FIG. 8 illustrates an FPGA time architecture at 250 with an FPGA illustrated at 252 and including a Timer Preload Register 254, Timer Fetch Register 256 and Free-Running Timer 258. A Clock Divider Circuit 260 receives a 19.2 MHz signal and sends a signal to the Free-Running Timer 258. A one (1) Pps or other Known Course Timer 262 is operative with the Timer Preload Register 254 and Timer Fetch Register 256. A one (1) Pps synchronization line is operative with the black input/output processor (BIOP) 270 and is received in a time of day Manager for the Waveform 272 that receives UTC time 274. As illustrated, the BIOP 270 provides a UTC time through: (1) a timer service such as a CORBA call which returns to hardware timer value; (2) POSIX time; and (3) direct access to the "Now" object as an HW timer value.

Figure 8A:
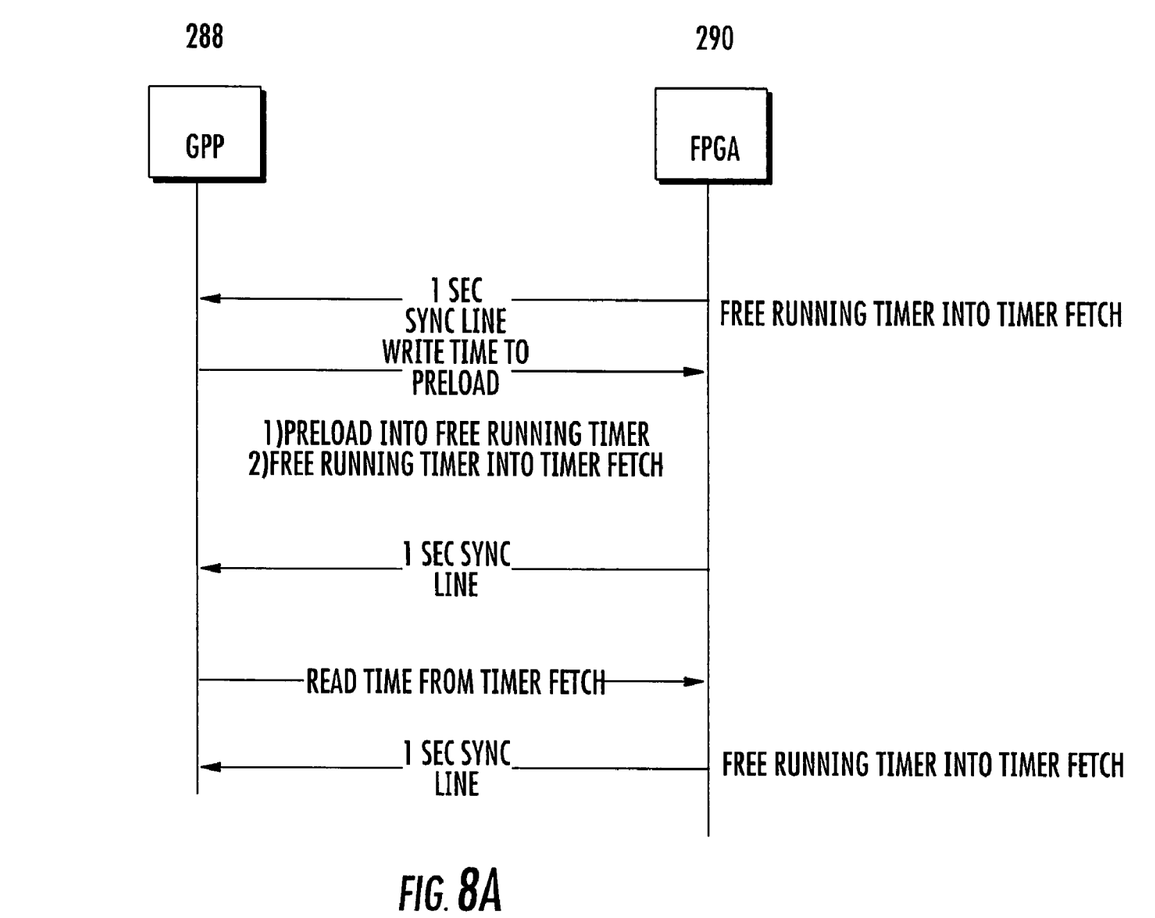
FIG. 8A is a chart showing a sequence between a General Purpose Processor (GPP) and FPGA in accordance with a non-limiting example of the present invention.

FIG. 8A shows the synchronization between the GPP 288 as a general purpose processor and the field programmable gate array 290 with the free-running timer into a timer fetch and the synchronization between each.

Figure 9:
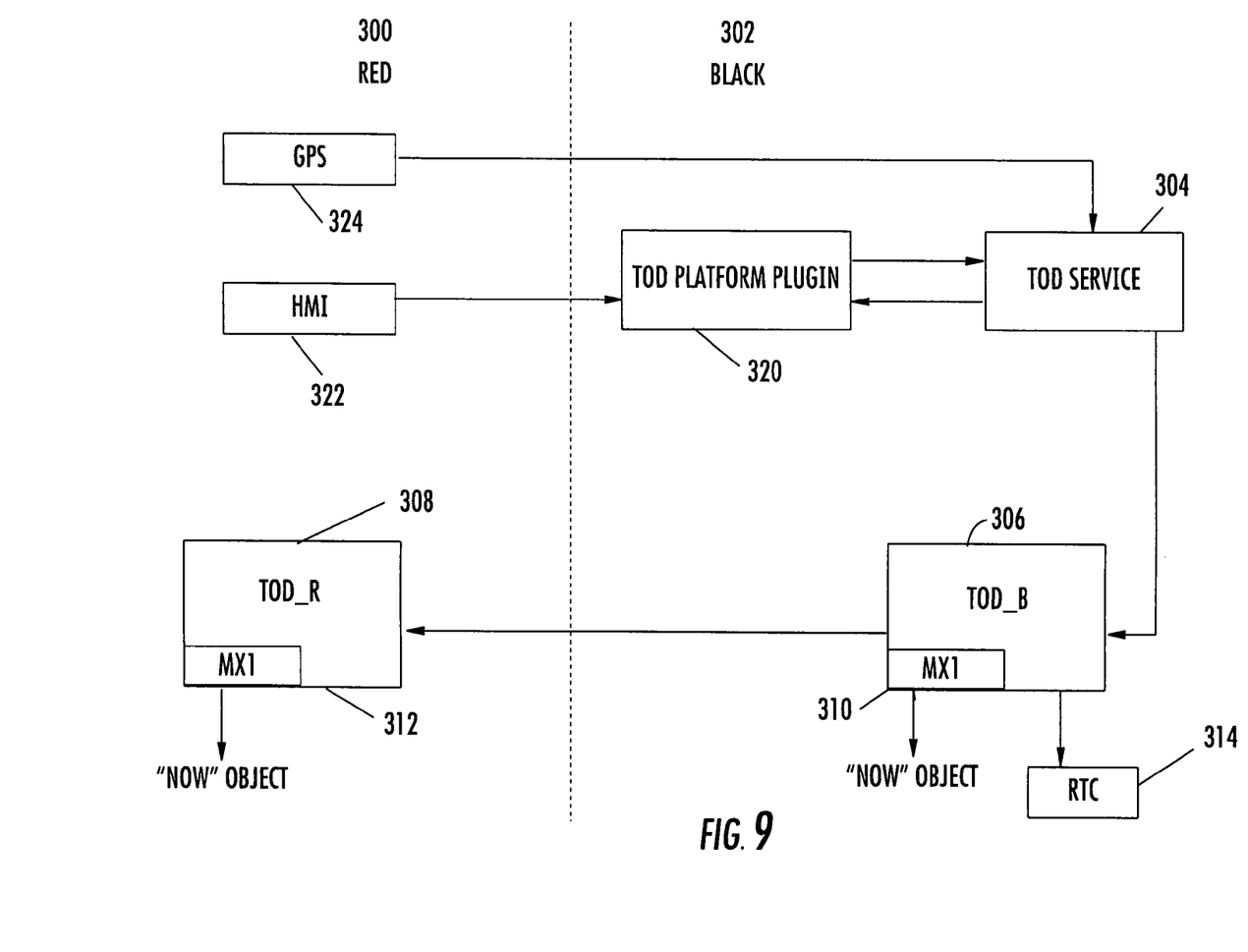
FIG. 9 is a block diagram of the time of day distribution showing basic components with the platform plugin.

FIG. 9 is a high level block diagram showing red and black subsystems 30, 302 with the time of day service 304 as part of the black subsystem and operative with the TOD_B 306 and TOD_R 308 each having a respective MX1 timer 310, 312. The TOD_B 306 is operative with the RTC 314. The TOD Service 304 is operative with the TOD platform plugin 320, which in turn, receives signals from the HMI 322. The GPS 324 can send signals to the TOD Service 304 as illustrated.

As indicated, the time of day for the radio can be based off the free-running BFPGA timer that is powered off the 19.2 MHz TCXO 220. On power up, the black and red timers can be preloaded. The BFPGA and the RFPGA can receive a one (1) Pps that comes out of the RTC. On the pulse, the Clock Signal (CLK) line could trigger and start the timers. When (if) GPS acquires, a GPS pulse could be sent to the RFPGA. When the RFPGA receives the pulse, it can record the current time of day and store that value in a register. It can send an interrupt to GPS (TOD as long as the offset is accounted for somewhere) where GPS will store the offset for use when sending time to TOD. When an MFPGA is configured, the time of day in the BFPGA can be loaded into the MPFGA.

As shown in FIG. 8, the FPGA designer can provide a synchronization line to the BIOP 270, which can be used to obtain time (POSIX, system time, or "Now" time). The FPGA can have the 19.2 MHz reference from the TCXO. The FPGA timer can be set to any time reference by a waveform providing the delta between that reference and UTC is established.

As shown in FIG. 9, the interaction between red and black subsystems is shown. Time of day on the radio is tracked by the "Now" object and is maintained by the TOD_B (black-side time component). The "Now" object is a software component connected to a BFPGA timer used to track UTC time as number of seconds since the base date (currently Jan. 1, 1970). The TOD_B component is used to update the "Now" object as well as update the TOD_R component (red-side time component). In this paradigm, TOD_B is considered the master, and TOD_R is considered the slave. TOD Service 304 and the TOD platform plugin 320 are CORBA components that, together, handle time and date requests from GPS and HMI. The platform plugin 320 is also used to read and write to the platform database.

HMI 322 can request a time change via the TOD platform plugin 320. That request can be sent to TOD Service 304, where an offset to the radio time can be computed and stored in the database. That offset will be stored until no waveforms are running on the radio. When no waveforms are running on the radio, TOD Service 304 can make a call to TOD_B to update the radio time and reset the stored offset to zero. TOD_B (black-side TOD) will update the "Now" object to reflect the offset, write the new time to the real time chip (RTC), and send the new time to TOD_R (red-side TOD).

GPS time change can follow the same algorithm as the HMI change with the exception that the initial request will go to the TOD Service, instead of through the platform plugin.

When a new offset is computed by TOD, the new offset will be sent to every waveform plugin. It is expected that the waveform plugin will store the current time offset. This offset should be stored in the waveform database, so it can be kept through power ups. Once the time change is made, TOD will make a call to every waveform plugin to update their time. The waveform will reset their time offset to zero and update any other offsets that the waveform is tracking. It is up to the waveform to implement a function that will perform the updates. A time change request can come from either HMI or GPS. When a time change is requested, a waveform can be in one of three states: 1) The waveform is running, 2) the waveform is not running, but another waveform is running, or 3) the waveform is not running and there are no other waveforms running.

When the waveform is running, a time request comes into TOD, which computes an offset between the new time, and the current "Now" time. The offset is stored in the database. The time change is sent to the waveform. The waveform then decides whether or not to accept the time change. If the waveform accepts the time change, the "Now" object and all other TOD components will be updated to reflect the new time. The stored offset will be reset to zero.

When the waveform is not running, but another waveform is running, a time request comes into TOD, which computes an offset between the new time, and the current "Now" time. The offset is stored in the database. A call is made to the waveform plugin that there is a new offset. The waveform is responsible for tracking the current offset. The waveform can store the new offset into its database. Once there is no waveform running, TOD can update radio time components (including "Now") to reflect the new time. TOD can reset its offset to zero and make a call to the waveform plugin to reset their offset to zero. The waveform plugin can reset its offset, and update any other offsets the waveform may be tracking to reflect the new time.

When no waveforms are running on the radio, a time request comes into TOD. The TOD updates time components on the radio (including "Now"). TOD can make a call to the waveform plugin to reset its offset to zero. The waveform plugin can reset its offset, and update any other offsets the waveform may be tracking to reflect the new time.

When a time request is made, the TOD can compute an offset between the "Now" time and the new time (cumulative offset). When a time request is made, TOD can compute an offset between the last offset and the new time (current offset). When a time request is made, TOD can send both the current offset as well as the cumulative offset to all waveform plugins. When system time has changed ("Now" object updated) TOD can send a current offset of zero and a cumulative offset of zero to all waveform plugins to indicate the offsets have been reset.

Each waveform that needs to actively track waveform offsets can implement a function called "UpdateOffset", which can take in the new time offset as well as the cumulative time offset. The "UpdateOffset" function can be used to store the current offset to the waveform's database as well as update any offsets the waveform plugin is maintaining.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software defined radio comprising:
a pair of radio subsystems each having a processor and operable for loading a plurality of waveform plugins at the same or different times such that one or more waveforms can be instantiated; and
a real time clock operative to be read by at least one of the radio subsystems for determining time of day, wherein said processor of the radio subsystem is operative for distributing the time of day to the radio subsystems using a global hardware timing pulse, and further comprising a time of day service for obtaining time when one or more waveforms are instantiated, wherein a time offset is obtained from the time of day service and a time update occurs via a human machine interface or GPS when a waveform is not instantiated, and the time offset used by instantiated waveforms is tracked until there is no waveform instantiated, at which time a time update occurs such that one or more waveforms are later instantiated.

2. A software defined radio according to claim 1, wherein said pair of radio subsystems comprises a red (command) and black (data) radio subsystem having an operating environment conformable to the Software Communications Architecture (SCA) specification.

3. A software defined radio according to claim 1, wherein each processor comprises a Field Programmable Gate Array (FPGA).

4. A software defined radio according to claim 1, wherein each processor includes a free-running timer to which any time sources within the pair of radio subsystems are set.

5. A software defined radio according to claim 1, wherein each processor includes registers in which said time of day is stored, wherein said registers are incremented in unison to each other using a common clock to create a free running system time.

6. A software defined radio according to claim 5, wherein at least one processor is operative for computing time of day offsets to the free running system time when the time of day has changed, and distributing the time of day offsets to the radio subsystems.

7. A software defined radio according to claim 1, and further comprising a waveform source to which the radio subsystems can instantiate a waveform, wherein time of day can be obtained from a waveform.

8. A software defined radio according to claim 1, wherein a processor is operative for computing time of day offsets and distributing the time of day offsets to the radio subsystems.

9. A software defined radio according to claim 8, wherein time of day offsets are distributed using a Common Object Request Broker Architecture (CORBA).

10. A software defined radio according to claim 1, wherein said subsystems comprise red (command) and black (data) radio subsystems having an operating environment conformable to the Software Communications Architecture (SCA) specification, and each includes digital signal processors (DSP's) and waveform components.

11. A system for synchronizing time of day within a software defined radio comprising:
a red (command) and black (data) radio subsystem having an operating environment conformable to the Software Communications Architecture (SCA) specification and operable for loading a plurality of waveform plugins at the same or different times such that one or more waveforms can be instantiated; and
a field programmable gate array (FPGA) and free running timer within each radio subsystem wherein said timers are synchronized and any time sources within the radio subsystems are set to the free running timers, and further comprising a time of day service for obtaining time when one or more waveforms are instantiated, wherein a time offset is obtained from the time of day service and a time update occurs via a human machine interface or GPS when a waveform is not instantiated, and the time offset used by instantiated waveforms is tracked until there is no waveform instantiated, at which time a time update occurs such that one or more waveforms are later instantiated.

12. A system according to claim 11, and further comprising a real time clock operative to be read by a FPGA and distributed within the radio subsystems by a global hardware timing pulse.

13. A system according to claim 11, wherein said FPSA's includes registers in which the time of day is stored, wherein said registers are incremented in unison to each other using a common clock to create a free running system time.

14. A system according to claim 13, wherein a FPGA is operative with a radio subsystem for computing time of day offsets to the free running system time when the time of day has changed, and distributing the time of day offsets to the free running system time for the radio subsystems.

15. A system according to claim 14, wherein said time of day offsets are distributed within said radio subsystems using a Common Object Request Broker Architecture (CORBA).

16. A system according to claim 11, and further comprising a waveform source to which the radio subsystems can instantiate a waveform, wherein time of day can be obtained from a waveform.

17. A method of synchronizing time of day within radio subsystems in a software defined radio, which comprises:
loading a plurality of waveform plugins at the same or different times such that one or more waveforms are instantiated;

reading a time of day from a real time clock;

storing the time of day within the radio subsystems;

distributing the time of day to any processing elements within the radio subsystems using a global hardware timing pulse, and further comprising obtaining a time offset as one or more waveforms are instantiated through a time of day service and updating time via a human machine interface or GPS when a waveform is not instantiated; and tracking the time offset used by instantiated waveforms until there is no waveform instantiated, at which time a time update occurs and subsequently instantiating one or more waveforms.

18. A method according to claim 17, which further comprises synchronizing free running timers contained within each of the radio subsystems and setting any time sources within the processing elements to the free running timers.

19. A method according to claim 17, which further comprises storing the time of day within field programmable gate array (FPGA) registers corresponding to red (command) and black (data) radio subsystems having an operating environment conforming to the Software Communications Architecture (SCA) specification.

20. A method according to claim 19, which further comprises incrementing the FPGA registers in unison with each other using a common clock source to create a free running system time.

21. A method according to claim 20, which further comprises computing an offset of a time of day to the free running system time when time of day has changed, and distributing the time of day as an offset to the free running system time.

22. A method according to claim 17, which further comprises obtaining time of day from a waveform.

23. A method according to claim 17, which further comprises determining time of day offsets and distributing the time of day offsets the radio subsystems.

24. A method according to claim 23, which further comprises distributing the time of day offsets using a Common Object Request Broker Architecture (CORBA).

25. A method according to claim 23, which further comprises distributing time of day offsets to red (command) and black (data) radio subsystems.

26. A method according to claim 23, which further comprises distributing time of day offsets to red and black FPGA's, digital signal processors (DSP's) and waveform components.

* * * * *